UNITED STATES PATENT OFFICE.

CHARLES C. RUEGER, OF SAN FRANCISCO, CALIFORNIA.

IMPROVEMENT IN PROCESSES FOR THE PRODUCTION OF LEAD PAINTS.

Specification forming part of Letters Patent No. 151,799, dated June 9, 1874; application filed March 25, 1874.

*To all whom it may concern:*

Be it known that I, CHARLES C. RUEGER, of San Francisco city and county, State of California, have invented a Process for the Production of Lead Paints; and I do hereby declare the following description is sufficient to enable any person skilled in the art or science to which it most nearly appertains to make and use my said invention without further invention or experiment.

My invention relates to an improved process for the production of lead paints; and consists in the reaction of caustic lime, quicklime, or hydrate of lime, $(CaO,HO,)$ in any form, upon sulphate of lead $(PbO,SO_3.)$ In general terms the process consists in mixing with sulphate of lead (no matter from what source obtained) certain proportions of caustic lime in such qualities, at such times, and in such a manner as will produce certain reactions and changes in the substances used, giving the products certain properties desirable in lead paints, by means not heretofore used.

The process as carried out at present consists in dissolving granulated lead in nitric acid, and then precipitating with sulphuric acid or a soluble sulphate. The sulphate of lead so obtained is washed out several times with water, and so much milk of lime is gradually stirred in as shall be necessary to combine with approximately one-half of the sulphuric acid, which is combined with the oxide of lead. Of course the process need not be restricted to this particular proportion of lime, since products of more or less value can be obtained by the use of other quantities varying somewhat from the above.

The product from the treatment with lime, which possesses approximately the composition of a basic sulphate of lead mixed with more or less gypsum and unchanged sulphate of lead, (as near as I have yet developed its constitution,) is washed out thoroughly with water, dried, and sold either in this condition or ground in oil.

I am aware that potassa and soda have been tried, but the process is too expensive, besides differing from that which I employ in the use of lime. I do not, therefore, claim the use of these; but

Having thus described my invention, what I claim, and desire to secure by Letters Patent, is—

1. The process of producing lead paint by the admixture of lime and sulphate of lead, substantially in the manner specified.

2. Lead paint produced by the reaction of lime and sulphate of lead, as a new product.

In witness whereof I hereunto set my hand and seal.

CHARLES C. RUEGER. [L. S.]

Witnesses:
JOHN L. BOONE,
C. M. RICHARDSON.